T. J. GRAY.
ENGINE STARTER.
APPLICATION FILED DEC. 16, 1913.
Reissued Jan. 13, 1914.
13,675.
2 SHEETS—SHEET 1.
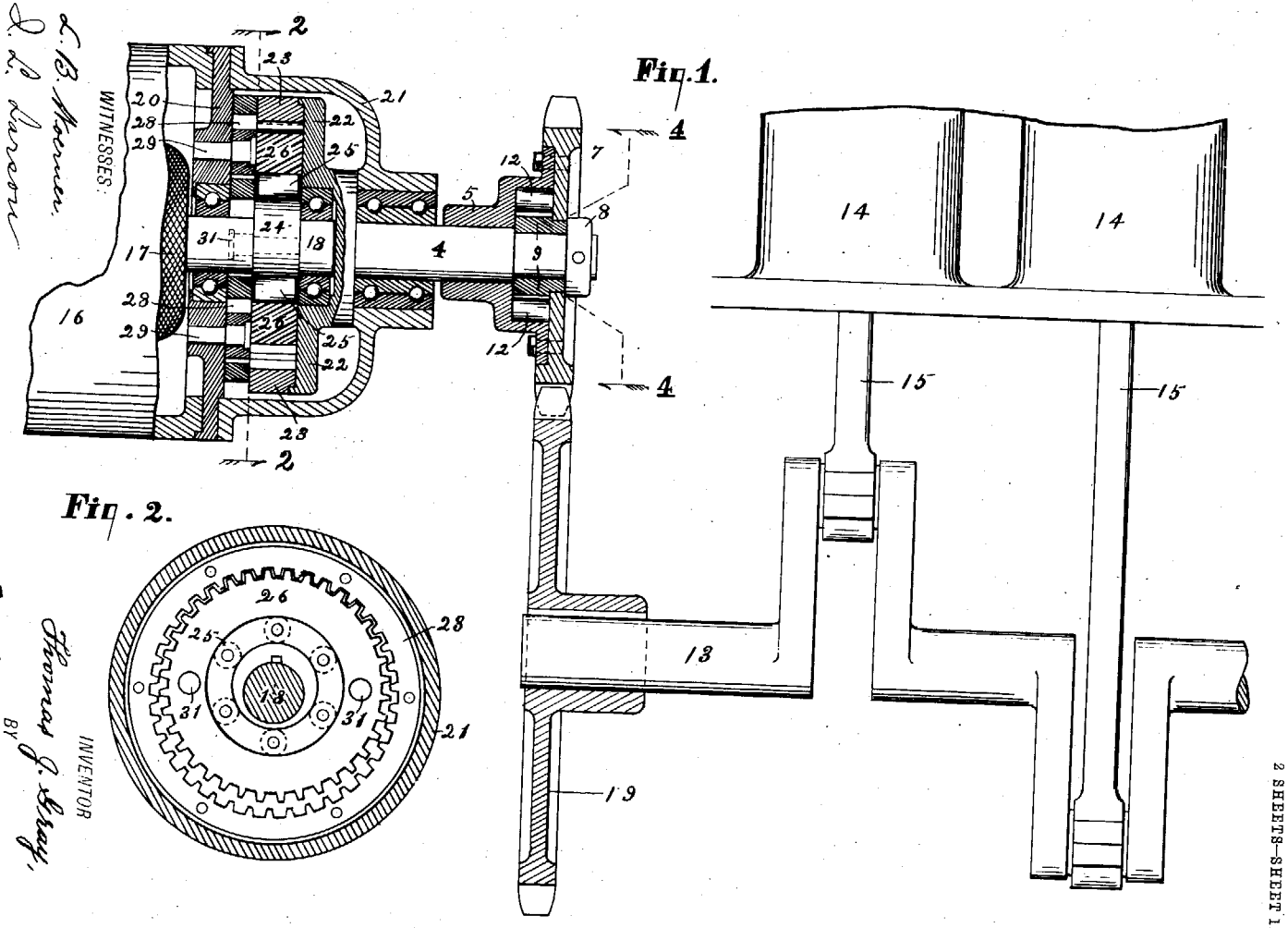
WITNESSES:
L. B. Moerner.
D. L. Larson
INVENTOR
Thomas J. Gray,
BY
Minturn & Moerner
ATTORNEYS.

T. J. GRAY.

ENGINE STARTER.

APPLICATION FILED DEC. 16, 1913.

Reissued Jan. 13, 1914.

13,675.

2 SHEETS—SHEET 2.

WITNESSES:

F. B. Moerner.

J. L. Larson

INVENTOR

Thomas J. Gray,

BY

Minturn & Moerner.

ATTORNEYS.

UNITED STATES PATENT OFFICE.

THOMAS J. GRAY, OF INDIANAPOLIS, INDIANA, ASSIGNOR, BY DIRECT AND MESNE ASSIGNMENTS, TO GRAY ENGINE STARTER COMPANY, A CORPORATION OF INDIANA.

ENGINE-STARTER.

13,675. Specification of Reissued Letters Patent. Reissued Jan. 13, 1914.

Original application filed March 25, 1913, Serial No. 756,702. Divided and application filed August 28, 1913, Serial No. 787,225. Original No. 1,081,268, dated December 9, 1913. Application for reissue filed December 16, 1913. Serial No. 807,020.

*To all whom it may concern:*

Be it known that I, THOMAS J. GRAY, a citizen of the United States, residing at Indianapolis, in the county of Marion and State of Indiana, have invented certain new and useful Improvements in Engine-Starters, of which the following is a specification.

This invention is a division of my original application, Serial No. 756,702, filed March 25, 1913.

This invention relates to means for connecting a driving shaft, such as an armature shaft of an electric motor, with a driven shaft, by means of a speed-reducing gearing, and to means for connecting the driven shaft with the crank-shaft of an internal combustion engine, and to means for automatically coupling and uncoupling the mechanism somewhere between the driving shaft and the crank-shaft.

The object of the invention is to release or uncouple the speed-reducing gearing from the crank-shaft, when the engine gets to racing as most internal combustion engines frequently do, and thus avoid injury on such occasions to the speed-reducing gearing.

I accomplish the above objects and other objects which will hereinafter appear, by the mechanism illustrated in the accompanying drawings, in which—

Figure 4:
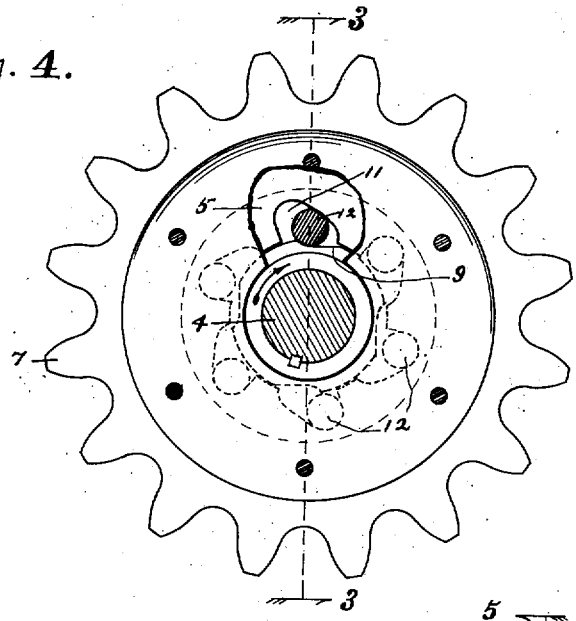
Figure 5:
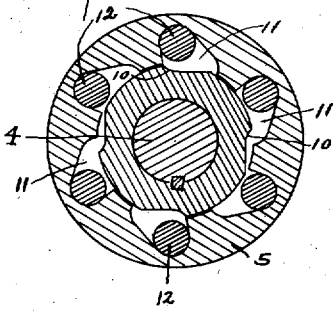
Figure 6:
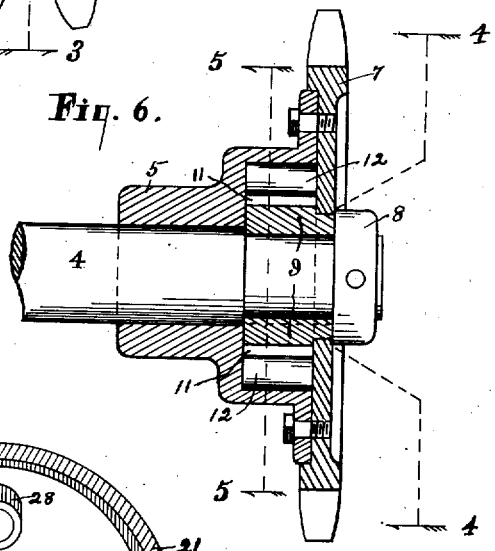
Figure 3:
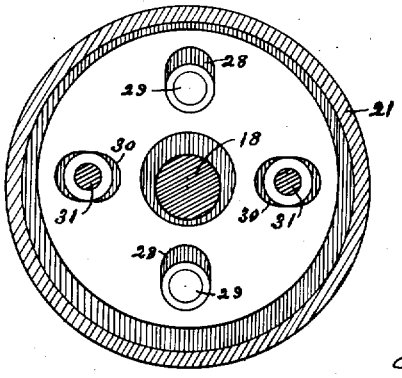

Figure 1 is a diagrammatic view showing portions of an electric motor, and of an internal combustion engine with my improved mechanism applied thereto, the major portion of the latter being shown in section. Fig. 2 is a cross section on the line 2—2 of Fig. 1 looking in the direction of the arrow. Fig. 3 is a section in the same plane looking in the opposite direction from that indicated by the arrow. Fig. 4 is a view in side elevation of the gear wheel of my improved gravity clutch broken away in part and showing the shaft on which it is loosely mounted in cross section on the line 4—4 of Figs. 1 and 6. Fig. 5 is a cross section on the line 5—5 of Fig. 6, and Fig. 6 is a section on the line 3—3 of Fig. 4, showing the centrifugal clutch mechanism.

Like characters of reference indicate like parts throughout the several views of the drawings.

13 is the crank-shaft of an internal combustion engine of any usual and well known construction of which 14 are the cylinders and 15 the connecting rods.

16 is an electric motor having an armature 17 mounted on a shaft 18, and 4 is an extension of the shaft 18, normally separate therefrom and connected therewith by gearing hereinafter to be described. Loosely mounted on the shaft 4 is the female portion 5 of a clutch which provides a support to which the gear wheel 7 is rigidly fixed. The shaft 4 is continued beyond the clutch portion 5, but is reduced in diameter, as shown in Figs. 1 and 6, and upon this reduced portion of the shaft the male member 9 of the clutch is rigidly keyed fast, the female portion 5 providing a housing for inclosing the male member 9 of the clutch. The extreme outer end of the shaft 4 may be provided with a collar 8, if desired.

The male member 9 of the clutch is cylindrical in general contour of its periphery, but this cylindrical surface is broken by a series of equidistant notches 10, here shown as four in number. One side of each notch is a plane along a chord of the circle of the periphery and the other and much shorter side is a curve. This notched male member 9 of the clutch enters a suitable recess in the adjacent portion of the female clutch member 5, which recess as to its major middle portion is round in cross section and of a diameter to permit the male member 9 to rotate freely therein with a close moving fit. Extending out from this round bore of the female clutch portion 5 are a plurality of equidistant pockets 11, the outer ends of which are semi-cylindrical and of sufficient depth to receive rollers 12 entirely outside of said round bore of the clutch when the rollers are seated in the said outer ends of the pockets. There is one roller 12 for each pocket 11 and the number of pockets is greater than the number of notches 10 in the periphery of the male member 9 of the clutch; in the example here shown in the drawings there are six pockets and the same number of rollers, and four of the notches 10. The shape of each pocket 11 is such as to permit its roller 12 to roll freely out of its semi-cylindrical end into contact with the periphery of the male member 9, and to roll into one of the notches 10, when one of said notches comes into register with the mouth of a pocket 11 in vertical position above the axis of the shaft 4.

Under the conditions last mentioned the roller 12 will drop by gravity into the notch 10 and will then lock the male clutch member 9 to the female clutch member 5 by the continued movement of the shaft 4. Because of the less number of the notches 10 in the male clutch member 9, and the above described shape of the notches and pockets, only one notch 10 can come into register with the mouth of a pocket 11 at a time, to permit the dropping of a roller 12 into locking position, and when the speed of the female clutch member 5 reaches approximately one hundred and twenty revolutions per minute, centrifugal action will throw the rollers 12 all out into the outer ends of their respective pockets and retain them there while the speed continues, thus releasing the male clutch member 9 and the mechanism drivingly connected with it. The teeth of the spur-gear 7 are in constant mesh with those of the spur-gear 19 mounted on the crank-shaft 13.

20 is the head of the electric motor, and secured to it is a gear-housing 21, which supports suitable ball bearings for the shaft 4. The inner end of the shaft 4 is provided with a flange 22 to which a ring 23, having internal cogs, as shown in Figs. 1 and 2, is bolted or riveted.

Mounted on the armature shaft 18 is an eccentric 24 which rotates with said shaft, and mounted on roller bearings 25 on the eccentric 24 is a gear wheel 26 with external teeth meshing with the teeth of the internal gear wheel 23. The wheel 26 is smaller in diameter than the gear wheel 23, as shown in Figs. 1 and 2, whereby only a portion of the teeth of the two wheels will be in engagement at one time.

27 is a floating plate between the head 20 of the electric motor and the external gear 26. Said plate has two diametrically opposite slots 28 to receive rollers on pins 29 mounted in the electric motor head 20, and it also has two diametrically opposite slots 30 in a line at right angles to that of the slots 28, to receive rollers on pins 31 carried by the spur-gear wheel 26. This constrained and floating movement of the plate or wheel 27 allows the spur-gear wheel 26 to adjust itself or gyrate in keeping with the changes in position of the cam 24 on which it is mounted, without permitting the rotation of said spur-gear. The difference in the number of teeth in the gear wheel 23 reduces the rate of travel between the motor shaft 18 and the extension 4.

In the operation of my invention the male member 9 of the clutch is driven, at starting, in the direction of the arrow, by the electric motor, and one of the rollers 12 will drop into a notch 10 in said male member, as shown in Fig. 4, and a lock will be formed between the male and female members of the clutch. Motion will thereby be imparted through the gear wheels 7 and 19 to the crank-shaft 13, and this will continue until ignition takes place in the cylinders 14 of the engine. When that occurs the shaft 13, gear wheels 19 and 7 and the female member 5 of the clutch will acquire a greater velocity from the engine than they had from the electric motor and when the velocity of the female member 5 of the clutch reaches one hundred and twenty revolutions per minute, or more, the rollers 12, by the racing of the engine, will be thrown into their pockets by centrifugal force, and out of bearing contact with the male member 9 of the clutch, and will remain there inert, automatically uncoupling the shaft 4 and speed-reducing gear from the engine.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements and the substitution of equivalents, as circumstances may suggest or necessity render expedient.

I claim:—

1. The combination with an electric motor and an internal combustion engine of gear means transmitting power at a reduced speed from the motor to the engine to start the engine comprising automatic means operated by the speed of the engine to release the engine when the engine races and to connect the engine and motor when the latter acts as the driving agent.

2. In an engine starter, an electric motor having a driving shaft, a driven shaft, speed reducing gearing drivingly connecting the two shafts, an internal combustion engine having a crank-shaft, means for automatically connecting the driven shaft with the crank-shaft, and for automatically disconnecting them when the engine is racing.

3. An electric motor having a driving shaft, a driven shaft, a crank-shaft, speed reducing mechanism transmitting motion from the driving shaft to the driven shaft, transmission means between the driven shaft and the crank-shaft comprising automatic means for disconnecting the crank-shaft at a predetermined speed of the latter and for automatically connecting the crank-shaft when the motor acts as the driver.

4. An electric motor having a driving shaft, a driven shaft, an internal combustion engine having a crank-shaft, speed reducing mechanism transmitting motion from the driving shaft to the driven shaft, transmission means between the driven shaft and crank-shaft comprising automatic means for disconnecting the crank-shaft when its speed has reached approximately one hundred and twenty revolutions a minute and for automatically connecting the crank-shaft when the motor acts as the driver.

5. An electric motor having a driving shaft, a driven shaft, an internal combustion engine having a crank-shaft, speed reducing mechanism transmitting motion from the driving shaft to the driven shaft, transmission means between the driven shaft and crank-shaft and means connecting said driven shaft with the crank-shaft comprising a wheel loosely mounted on said driven shaft, a female clutch member loosely mounted on the driven shaft and having a central bore to receive the peripherally notched male clutch member and having a number of pockets located around and communicating with said central bore, a peripherally notched clutch member rigidly fixed to the driven shaft and working within the central bore of the female clutch member, the number of pockets in the female clutch member being greater than the number of notches in the periphery of the male member, and a roller loosely mounted on each of said pockets.

6. The combination, of an electric motor having a driving shaft, an eccentric rotating therewith, a driven shaft, an internal gear wheel secured to the driven shaft, a spur-gear wheel mounted on the eccentric and having teeth engaging the teeth of the internal gear wheel, means to prevent rotation of the spur-gear wheel while permitting gyration, an internal combustion engine having a crank-shaft, and means connecting said driven shaft with the crank-shaft comprising a clutch which remains locked when the motor acts as the driver and automatically releases when the crank-shaft becomes the driver.

7. The combination, of an electric motor having a driving shaft, an eccentric rotating therewith, a driven shaft, an internal gear wheel secured to the driven shaft, a spur-gear wheel mounted on the eccentric and having teeth engaging with the teeth of the internal gear wheel, a plate having a floating movement without rotation, means to lock the floating plate to the spur-gear to provide for a floating movement of the latter, an internal combustion engine having a crank-shaft, and means connecting said driven shaft with the crank-shaft comprising a clutch which remains locked when the motor acts as the driver and automatically releases when the crank shaft becomes the driver.

8. The combination, of an electric motor having a driving shaft, an eccentric rotating therewith, a driven shaft, an internal gear wheel secured to the driven shaft, a spur-gear wheel mounted on the eccentric and having teeth engaging with the teeth of the internal gear wheel, a floating plate adjustable in two directions at right angles to each other without rotation, means to lock the floating plate to the spur-gear to permit of a floating movement of the latter, an internal combustion engine having a crank-shaft, and means connecting said driven shaft with the crank shaft comprising a gravity clutch which unlocks by centrifugal action when the crank-shaft becomes the driver.

9. The combination, of an electric motor having a driving shaft, an eccentric rotating therewith, a driven shaft, an internal gear wheel secured to the driven shaft, a spur-gear wheel mounted on the eccentric and having teeth engaging with the teeth of the internal gear wheel, means to prevent rotation of the spur-gear wheel while permitting gyration, an internal combustion engine having a crank-shaft, and means connecting said driven shaft with the crank-shaft comprising a wheel loosely mounted on said driven shaft, a female clutch member loosely mounted on the driven shaft and having a central bore to receive the peripherally notched male clutch member and having a number of pockets located around and communicating with said central bore, a peripherally notched clutch member rigidly fixed to the driven shaft and working within the central bore of the female clutch member, the number of pockets in the female clutch member being greater than the number of notches in the periphery of the male member, and a roller loosely mounted in each of said pockets.

In witness whereof, I have hereunto set my hand at Indianapolis, Indiana, this 15th day of December, one thousand nine hundred and thirteen.

THOMAS J. GRAY.

Witnesses:
I. L. LARSON,
J. A. MINTURN.